United States Patent [19]

Catron

[11] 4,315,445
[45] Feb. 16, 1982

[54] KNOT TYING TOOL

[76] Inventor: Woodrow Catron, P.O. Box 104, Mosier, Oreg. 97040

[21] Appl. No.: 135,505

[22] Filed: Mar. 31, 1980

[51] Int. Cl.³ .............................................. B25B 7/00
[52] U.S. Cl. ................................... 81/5.1 R; 7/127; 7/133; 43/1
[58] Field of Search ..................... 7/127, 133; 43/1; 81/5.1 R, 418, 425 R; 289/17

[56] References Cited

U.S. PATENT DOCUMENTS

| | | | |
|---|---|---|---|
| 745,623 | 12/1903 | Hunton | 289/17 |
| 1,840,044 | 1/1932 | Mattes | 81/425 R X |
| 2,697,624 | 12/1954 | Thomas et al. | 43/1 X |
| 2,747,246 | 5/1956 | Oldham | 289/17 X |
| 2,758,858 | 8/1956 | Smith, Sr. | 43/1 X |
| 2,992,029 | 7/1961 | Russell | 43/1 X |
| 3,664,346 | 5/1972 | Dunn | 81/5.1 R X |
| 4,206,663 | 6/1980 | Pace | 81/418 X |
| 4,208,749 | 6/1980 | Hermann et al. | 7/133 X |

Primary Examiner—James G. Smith
Attorney, Agent, or Firm—Chernoff & Vilhauer

[57] ABSTRACT

A multipurpose hand tool for tying certain types of knots in fishing line includes an elongate finger which is tapered from a thick base toward a very small tip. The elongate finger has a rounded external shape, and a groove of decreasing depth extends along it from the base toward its tip, permitting an end of a line to be passed within turns of line wrapped around the elongate finger. The elongate finger includes two mating halves, each mounted on one of a pair of pivotably interconnected handles. Cavities are provided in the mating opposed faces of the mating halves of the elongate finger to hold the eye portion of a fishhook in order to tighten it by moving the two halves of the elongate finger toward one another. A line cutter included in the tool comprises a pair of opposed sharp edges located on the extreme side portion of each of the handles, permitting a line to be clipped close to a knot.

4 Claims, 9 Drawing Figures

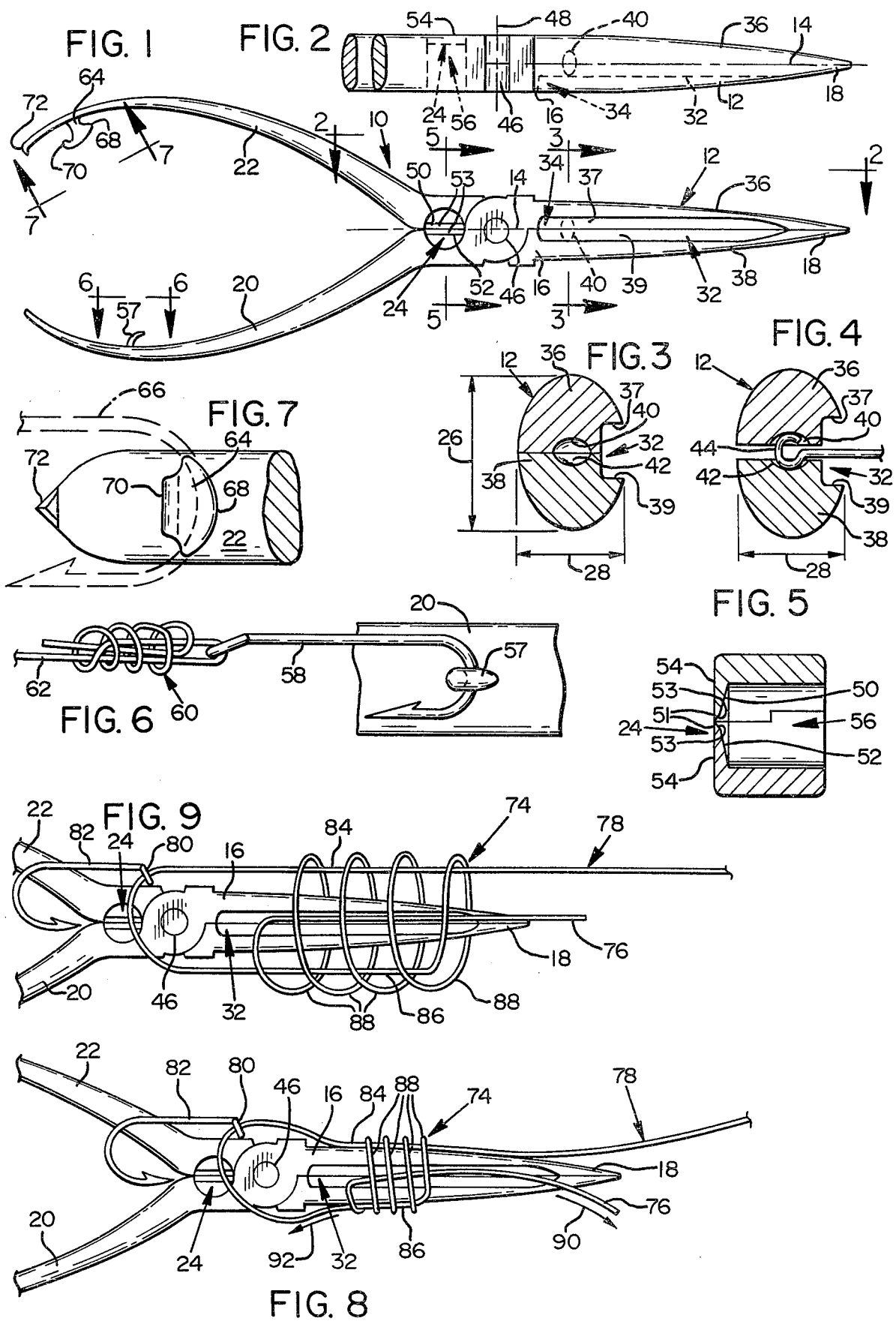

KNOT TYING TOOL

BACKGROUND OF THE INVENTION

The present invention relates to improvements in knot tying implements, and in particular to a novel tool useful in tying certain knots in fishing line and the like.

The use of fishing lines made of synthetic monofilament material presents certain problems not encountered with lines made of softer material such as braided fibers. Heavy monofilament and similar lines are somewhat stiff and also have smooth surfaces, therefore requiring the use of specialized knots in order to prevent slippage and to resist loosening of the knots during use.

Most of the knots useable to form a loop at the end of such a line or to join separate pieces of such line together require wrapping several turns of the line around a standing part of the line, inserting the end of the line where the knot is being tied through the interior of the wrapped turns, and thereafter drawing the entire knot tight. If such a knot is initially tied loosely, it is very difficult to thread the end of the piece of line through the wrapped turns to complete tying the knot. On the other hand, if the turns are wrapped loosely, it is difficult to hold the loops of the knot straight to prevent tangling of the knot at it is tightened.

Several devices have been provided to assist in tying secure knots in such fishing line and the like, for example, those disclosed by Thomas et al U.S. Pat. No. 2,697,624, Smith, Sr. U.S. Pat. No. 2,758,858, Russell U.S. Pat. No. 2,992,029, Frost et al U.S. Pat. No. 3,326,586, Stephens U.S. Pat. No. 3,494,648, and Smythe U.S. Pat. No. 3,837,691. The Thomas et al, Frost et al, Stephens, and Smythe patents all disclose knot tying aids including a member around which a line can be wrapped having a groove defined therein for permitting the end of a line to be slipped through the turns of line wrapped around the member. However, these devices all suffer from the fact that the member around which a line may be wrapped is of a generally uniform size along its entire useable length. As a result, when a knot formed on the device of any of these patents is initially removed from the device, it still may not be sufficiently tight to prevent tangling during completion of tightening the knot.

While the Smith, Sr. and Russell patents disclose knot tying devices which are tapered in one lateral dimension to a smaller size at the end of the device from which the knot being tied is removed, the lateral dimension perpendicular thereto is essentially constant and the groove formed therein of constant depth. Consequently, the magnitude of the latter dimension must be compromised between providing a groove deep enough to slip the end of the line through the loops, on the one hand, and minimizing the size of the loops as the knot is slipped off the end of the device, neither of which may be served satisfactorily.

Tying a knot of the sort contemplated in fishing line results in a loose end extending from the knot once the knot has been fully tightened. It is usually desirable to cut off such an end close to the knot to help avoid the knotted portion of the line becoming caught in seaweed, or becoming snarled in another portion of the fishing line. This is particularly desirable where two lengths of line are joined to one another, in order to prevent turbulence or accumulation of seaweed, etc., around the knot which could make the otherwise nearly invisible line apparent to a fish.

When a fishhook has been poorly made, or after it has become snagged during use, the eye loop of the hook may not be tightly closed. Although it is possible to tighten such a loop with conventional tools such as pliers, the jaws of pliers are not adapted to grip the eye of a fishhook securely enough to prevent slippage during tightening. As a result, during tightening of its eye a fishhook may slip from the pliers, and injure the fisherman, or at least make the task more difficult.

What is needed, then, is a tool to facilitate the tying of secure knots in monofilament and other hard to handle types of fishing line and the like. Preferably such a tool could also be used to perform other tasks relating to attaching lines to hooks, including holding a fishhook as a knot is pulled tight, clipping the end of a line close to a knot, and tightening an eye loop of a fishhook.

SUMMARY OF THE INVENTION

The above-mentioned shortcomings and drawbacks of previously known tools for tying knots in fishing lines have been overcome by the present inventing, which provides a multipurpose tool for tying secure knots, securely holding a fishhook during tightening of a knot, clipping the loose end of a line close to a knot, and repairing partially open eye loops of fishhooks.

The knot tying tool of the present invention comprises an elongate finger which is roughly conical in its general overall shape, tapering along its length from a base of maximum width and height to a relatively sharp tip. A groove extends along the elongate finger from its base to a point near the tip, the depth of the groove decreasing along its length, and the groove ending a short distance from the tip.

The elongate finger is formed in two mating halves, and the base end of each half is attached to one of a pair of pivotable interconnected handles which cross one another at the point of pivotable interconnection so that separation of the handles from one another also causes separation of the tip ends of the two halves of the elongate finger. Opposing cavities are defined in the halves of the finger to permit gripping the eye loop of a fishhook partially within each of the cavities, so that closing the handles toward one another exerts pressure to close the eye loop of the fishhook.

A line cutter incorporated in the tool includes a pair of opposing edges, one located on each of the two handles, aligned with one side surface of the tool. The two edges are so located with respect to one another that closing the handles toward one another brings the two sharpened edges into opposing contact with one another, to neatly clip a fishing line. The location of the opposing edges on one side such that they form a substantially continuously flat surface of the handles, permits a fishing line to be clipped extremely close to a knot to prevent excess line from causing unnecessary turbulence or snagging of seaweed or other matter which could be visible to a fish and thereby betray the presence of an otherwise practically invisible line.

A small protrusion is provided on an interior side of one of the handles to engage small fishhooks while tightening a knot in a line tied to the hook. A large protrusion extends inwardly from the interior side of the other of the two handles, near the end of that handle, which is sharpened for use as a can opener. The large protrusion includes a tooth which may be used to grip the crimped edge of a can while the sharpened end of the handle is used to pierce the end of a can, and the large protrusion may also be used to hold large fishhooks during tightening of knots in line tied to them.

It is therefore a principal objective of the present invention to provide an improved tool for facilitating the tying of knots in fishing line and the like.

It is another principal objective of the invention to provide a multipurpose tool which is particularly adapted for assisting tying a knot in fishing line, holding a fishhook during tightening of such a knot, tightening the eye loop of a fishhook, and cutting a fishing line after a knot has been tied in it.

It is a principal feature of the knot tying tool of the present invention that it utilizes an elongate finger tapered in two dimensions from a base thereof to a pointed tip around which a knot may be tied, which permits the knot to be tightened completely as it is withdrawn from the elongate finger.

It is another principal feature of the present invention that the elongate finger includes a longitudinal groove which extends from the base toward the tip thereof for enabling the loose end of a line to be slipped through the loops of a knot tied around the finger.

It is another feature of the finger of the knot tying tool of the present invention that it comprises two separable havles and a pair of respective cavities formed therein for gripping the eye loop of a fishhook and tightening it by moving the two halves toward one another.

It is another feature of the tool of the present invention that it includes opposed line-cutting edges which form a continuous flat surface when brought together, thereby permitting the tool to be used to clip the end of a line closely adjacent a knot.

It is yet another feature of the tool of the present invention that it has handles which include protrusions which enable the user to safely and securely hold a fishhook while tightening a knot in a line attached to the fishhook, and one of which also functions as a part of a can opener.

It is a principal advantage of the knot tying tool of the present invention that it permits a knot to be more readily tied in fishing line and the like.

It is another major advantage of the tool of the present invention that it may be used to close fishhook eye loops and to cut off excess fishing line closer to a knot more readily than with previously known tools.

It is a further advantage of the present invention that it provides an improved tool which can be used to perform multiple functions which are ordinarily associated with one another and must be frequently performed while fishing.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side view of an exemplary knot tying tool embodying the present invention.

FIG. 2 is a fragmentary top view of the elongate member of the knot tying tool shown in FIG. 1, taken along line 2—2.

FIG. 3 is a sectional view, on an enlarged scale, of the elongate member of the knot tying tool shown in FIG. 1, taken along line 3—3.

FIG. 4 is a sectional view, on an enlarged scale, of the elongate member of the knot tying tool shown in FIG. 1, showing the manner of using the tool to close the eye loop of a fishhook.

FIG. 5 is a sectional view, on an enlarged scale, of a line cutter portion of the knot tying tool shown in FIG. 1, taken along line 5—5.

FIG. 6 is a fragmentary view, on an enlarged scale, of one of the handles of the knot tying tool shown in FIG. 1, illustrating use of a small fishhook holding protrusion for tightening a typical knot which may be tied using the tool.

FIG. 7 is a fragmentary view taken along line 7—7 of FIG. 1, on an enlarged scale, of the other handle of the knot tying tool shown in FIG. 1, showing a large, combined fishhook holding protrusion and can opener.

FIG. 8 is a fragmentary view of the knot tying tool shown in FIG. 1 showing the use of the knot tying tool of the invention for tying a typical knot used for securing a fishhook to a line.

FIG. 9 is a fragmentary view of the knot tying tool shown in FIG. 1, showing the knot illustrated in FIG. 8 expanded for clarity.

DETAILED DESCRIPTION OF THE INVENTION

Referring now to FIGS. 1-4 of the drawings, an exemplary knot tying tool 10 embodying the present invention is shown in FIG. 1, where it may be seen to comprise an elongate finger 12 which is tapered along a longitudinal axis 14 from a base 16 toward a relatively small tip 18, which is preferably pointed. A pair of pivotably interconnected handles 20 and 22 are provided to grip the elongate finger 12, and a line cutter 24 is formed in the handles.

The base 16 of the elongate finger 12 has a generally rounded cross sectional shape, shown particularly in FIG. 3. The elongate finger 12 has a height dimension 26, and a width dimension 28, both orthogonally related to the longitudinal axis 14, and is tapered in both its height 26 and width 28 dimension, gradually decreasing in size along its longitudinal dimension to a minimum at the tip 18. A groove 32 is provided in the side of the elongate finger extending along the elongate finger from a point of maximum depth 34 at the base 16 of the elongate finger 12. The groove 32 decreases in depth along the elongate finger 12 and terminates near the tip of the elongate finger, as may best be seen in FIGS. 1 and 2. Typically, the groove would be about 3/16 inch wide, with a maximum depth 34 of about 1/16 inch, and would end about 5/16 inch from the extremity of the tip 18.

The elongate finger 12 is preferably formed of two mating halves 36 and 38, one half defining a side 37 and the other half 38 defining a side 39 of the groove 32. In a preferred version of the invention the two halves 36 and 38 meet in generally planar mating surfaces. Two cavities 40 and 42 are located respectively in each half 36 and 38 of the elongate finger, the two cavities opening toward one another for conveniently gripping the eye loop 44 of a fishhook by forcing the two halves of the finger together (FIG. 4) in order to squeeze the loop of an open eye 44 to a tightly closed form. Each cavity 40 and 42 is eliptical, with its longer axis extending transverse to the longitudinal axis of the elongate finger in the width dimension 28, the preferred size of the cavities being determined by the size of fishhook, although one size of cavity could be used for several sizes of fishhooks.

The halves 36 and 38 of the elongate finger 12 are fixedly attached respectively to the handles 20 and 22, which are pivotably interconnected to one another by a pivot joint 46 having a pivot axis 48 in the width dimension 28 of the finger. The handles 20 and 22 are of a convenient shape, preferably somewhat convexly curved, and size to permit the knot tying tool 10 of the invention to be gripped in one hand during its use. Because of the crossing relationship of the handles, movement of them apart from one another results in movement of the halves 36 and 38 of the elongate finger 12 apart from one another in alligator jaw fashion.

The line cutter 24 is separated from the elongate finger 12 by the pivot joint 46, and comprises a pair of sharpened edges 50 and 52 which are aligned in opposition with one another and are moveable toward and away from one another by relative movement of the handles 20 and 22. As may be seen in FIG. 5 the edges 50 and 52 are each formed by an outside surface 51 and an inside surface 53 meeting the outside surface at an acute angle to form the cutting edge. The two outside surfaces 51 form a substantially continuous flat surface 54, when the handles of the tool are brought together, while the two inside surfaces 53 of the line cutter are beveled toward the flat surface 54 from within a cavity 56 defined by the two opposing handles.

A small protrusion 57 located on the handle 20 is useable, as shown in FIG. 6, to hold a small fishhook 58 securely during tightening of a knot 60 in a line 62 tied to the fishhook by pulling the standing part of the line. Similarly, a larger protrusion 64 fixedly attached to the handle 22 is useable as shown in FIG. 7 to securely hold a fishhook 66 of larger size during tightening of a knot fastening a line to such a larger fishhook. The larger protrusion 64 includes a lip 68 which extends from the large protrusion in the general direction of the elongate finger 12 to assist in engaging the fishhook. A tooth 70 extends in the general direction of the end 72 of the handle, which is sharpened and curved. The tooth 70 and the end 72 thus form a can opener, the tooth 70 being used to engage the crimped rim of a can while the sharp end 72 of the handle 22 is used to pierce an end of the can.

The use of the knot tying tool of the invention in tying knots in fishing line and the like may be better understood with reference to FIG. 8, which shows a typical knot 74 being tied, and FIG. 9, in which the knot 74 is shown in a greatly expanded fashion for clarity. It may be seen that the loose end 76 of a line 78 has been passed through the eye 80 of a fishhook 82 which is positioned near the pivotable joint 46 between the two handles 20 and 22 of the tool 10. The standing part 84 of the line 78 is allowed to extend alongside the elongate finger 12, and a middle portion 86 of the line 78 extends from the eye 80 of the fishhook parallel to the standing part 84 of the line. Several turns 88 of line are wrapped around the standing part 84 of the line and the middle portion 86 of the line in a helix beginning near the tip 18 of the elongate finger 12 and extending toward the base 16 of the finger. Near the base of the finger 12 the end 76 of the line 78 has been bent toward the tip 18 of the finger and has been placed within the groove 32 defined by the finger. The groove 32 permits the end 76 to be passed through the interior of the turns 88 of line while they are held tightly wrapped around the elongate finger 12. Once the end 76 has been passed through the groove 32 within the turns 88 of line, the entire knot 74 may be gradually pulled toward the tip 18 of the elongate finger 12 with the turns 88 being continuously kept tight by pulling the loose end 76 and the middle portion 86 of the line in the directions indicated by the arrows 90 and 92 as the entire knot 74 is moved toward the tip 18 of the elongate finger.

When the knot 74 has been slipped along the elongate finger 12 to the end of the groove 32, this process is continued, and the tension in the turns 88 of line progressively exerts additional force to retain the three portions of the line which are within the turns 88. As each of the turns 88 successively moves clear from around the tip of the elongate finger, it continues to grip the portions of the line around which it is wrapped. Consequently, when the knot has in this manner been completely removed from the tip 18 of the elongate finger the knot is tightly formed, although the loop formed by the knot may be larger than is desired.

To reduce the size of the loop the hook 82 may be placed around the small protrusion 57 or the large protrusion 64, depending upon the size of the hook. While the user holds the knot tying tool 10 in one hand tension is exerted on the standing part 84 of the line 78 with the other hand, pulling the standing part 84 of the line through the knot to reduce the size of the loop. The end 76 of the line 78 is then again pulled while the hook 82 remains engaged on the small protrusion 57 or large protrusion 64, as the case may be, providing final tightening of the knot 74.

Once the knot 74 has been fully tightened the loose end 76 may be clipped off by inserting it between the opposed edges 50 and 52 of the line cutter 24 and exerting pressure by means of the handles 20 and 22 to bring the edges together, cutting the line. The location of the edges 50 and 52 at the extreme side of the knot tying tool and the flat surface 54 formed thereby permits the end of the line to be cut extremely close to the wrapped turns 88 of the knot 74.

The terms and expressions which have been employed in the foregoing specifications are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A hand tool for use in tying knots in fishing line and the like, comprising:
   (a) a tapered elongate finger having a base and a relatively smaller tip, said finger comprising mating first and second elongate halves, each also having a base and a tip, said finger having a longitudinal axis and height and width dimensions orthogonal to said longitudinal axis and being tapered along said longitudinal axis in said height and width dimensions from maximum height and width at said base toward minimum height and width at said tip;
   (b) handle means comprising a pair of elongate handles for holding said tool during its use, each of said handles being affixed to the base of a different one of said first and second elongate halves and extending away from said tips of said respective halves, said handles crossingly overlapping one another at a location adjacent said bases of said halves, and said handles being pivotally connected to one another such that said first and second halves may be moved between a position of mating contiguity and a position in which said halves are separated from one another;

(c) said elongate finger defining a groove therein, said groove extending along the longitudinal dimension of said finger from said base toward said tip, the depth of said groove decreasing in the direction of said tip; and (d) means for tightening a loop, including a pair of opposed cavities defined respectively by said first and second halves of said elongate finger, said cavities opening toward one another for receiving respective portions of a loop and being movable toward and away from one another in response to movement of said handles relative to one another.

2. A hand tool for use in tying knots in fishing line and the like, comprising:

(a) a tapered elongate finger having a base and a relatively smaller tip, said finger comprising mating first and second elongate halves, each also having a base and a tip, said finger having a longitudinal axis and height and width dimensions orthogonal to said longitudinal axis and being tapered along said longitudinal axis in said height and width dimensions from maximum height and width at said base toward minimum height and width at said tip;

(b) handle means comprising a pair of elongate handles for holding said tool during its use, each of said handles being affixed to the base of a different one of said first and second elongate halves and extending away from said tips of said respective halves, said handles crossingly overlapping one another at a location adjacent said bases of said halves, and said handles being pivotally connected to one another such that said first and second halves may be moved between a position of mating contiguity and a position in which said halves are separated from one another;

(c) said elongate finger defining a groove therein, said groove extending along the longitudinal dimension of said finger from said base toward said tip, the depth of said groove decreasing in the direction of said tip; and (d) cutting means for cutting said fishing line, said cutting means having opposed edges associated respectively with each of said handles and each being formed by an outside surface and an inside surface meeting said outside surface at an acute angle, said edges being movable toward and away from one another in response to relative movement of said handles, and the respective outside surfaces thereof forming a substantially continuous flat surface when moved adjacent one another.

3. A hand tool for use in tying knots in fishing line and the like, comprising:

(a) a tapered elongate finger having a base and a relatively smaller tip, said finger comprising mating first and second elongate halves, each having a base and a tip, said finger having a longitudinal axis and height and width dimensions orthogonal to said longitudinal axis and being tapered along said longitudinal axis in said height and width dimensions from maximum height and width at said base toward minimum height and width at said tip;

(b) handle means comprising a pair of elongate handles for holding said tool during its use, each of said handles being affixed to the base of a different one of said first and second elongate halves and extending away from said tips of said respective halves, said handles crossingly overlapping one another at a location adjacent said bases of said halves, and said handles being pivotally connected to one another such that said first and second halves may be moved between a position of mating contiguity and a position in which said halves are separated from one another;

(c) said elongated finger defining a groove therein, said groove extending along the longitudinal dimension of said finger from said base toward said tip, the depth of said groove decreasing in the direction of said tip; and (d) a small protrusion mounted on one of said handles, for engaging a fishhook and permitting tension to be applied to a line tied to said fishhook, said small protrusion being directed inwardly of said handle means and forwardly toward the pivotal connection of said handles.

4. A hand tool for use in tying knots in fishing line and the like, comprising:

(a) a tapered elongate finger having a base and a relatively smaller tip, said finger comprising mating first and second elongate halves, each having a base and a tip, said finger having a longitudinal axis and height and width dimensions orthogonal to said longitudinal axis and being tapered along said longitudinal axis in said height and width dimensions from maximum height and width at said base toward minimum height and width at said tip;

(b) handle means comprising a pair of elongate handles for holding said tool during its use, each of said handles being affixed to the base of a different one of said first and second elongate halves and extending away from said tips of said respective halves, said handles crossingly overlapping one another at a location adjacent said bases of said halves, and said handles being pivotally connected to one another such that said first and second halves may be moved between a position of mating contiguity and a position in which said halves are separated from one another;

(c) said elongate finger defining a groove therein, said groove extending along the longitudinal dimension of said finger from said base toward said tip, the depth of said groove decreasing in the direction of said tip; and (d) a large protrusion mounted on one of said handles for engaging a fishhook and permitting tension to be applied to a line tied to said fishhook, said large protrusion being directed inwardly of said handle means and including a lip on a first side thereof, for preventing a fishhook from slipping from said large protrusion, and a tooth oriented toward the extremity of said one of said handles, for engaging a crimpled edge of a metal can, and wherein said extremity of said one of said handles includes sharpened means for piercing an end of said can.

* * * * *

UNITED STATES PATENT AND TRADEMARK OFFICE
CERTIFICATE OF CORRECTION

PATENT NO. : 4,315,445
DATED : February 16, 1982
INVENTOR(S) : Woodrow Catron

It is certified that error appears in the above-identified patent and that said Letters Patent are hereby corrected as shown below:

Col. 2, Line 23      Change "inventing" to --invention--;

Line 38      Change "pivotable" to --pivotably--.

Col. 3, Line 26      Change "havles" to --halves--.

Col. 8, Line 15      Change "elongated" to --elongate--;

Line 62      Change "crimpled" to --crimped--.

Signed and Sealed this

Fourteenth Day of June 1983

[SEAL]

Attest:

DONALD J. QUIGG

Attesting Officer     Acting Commissioner of Patents and Trademarks